March 4, 1941. F. K. CHANDLER 2,234,041
APPARATUS AND METHOD FOR FEEDING CULTURED FEED TO ANIMALS
Filed Aug. 1, 1938 2 Sheets-Sheet 2
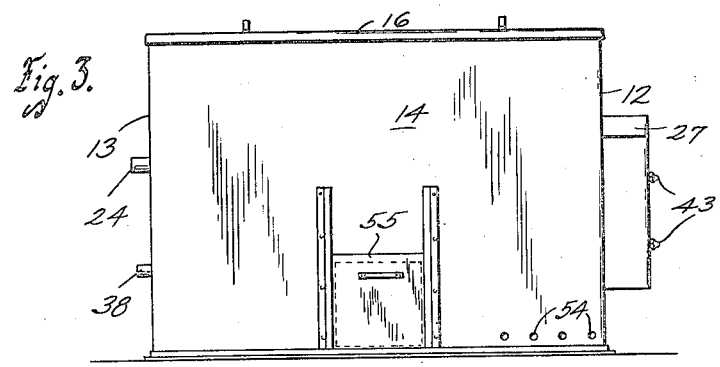
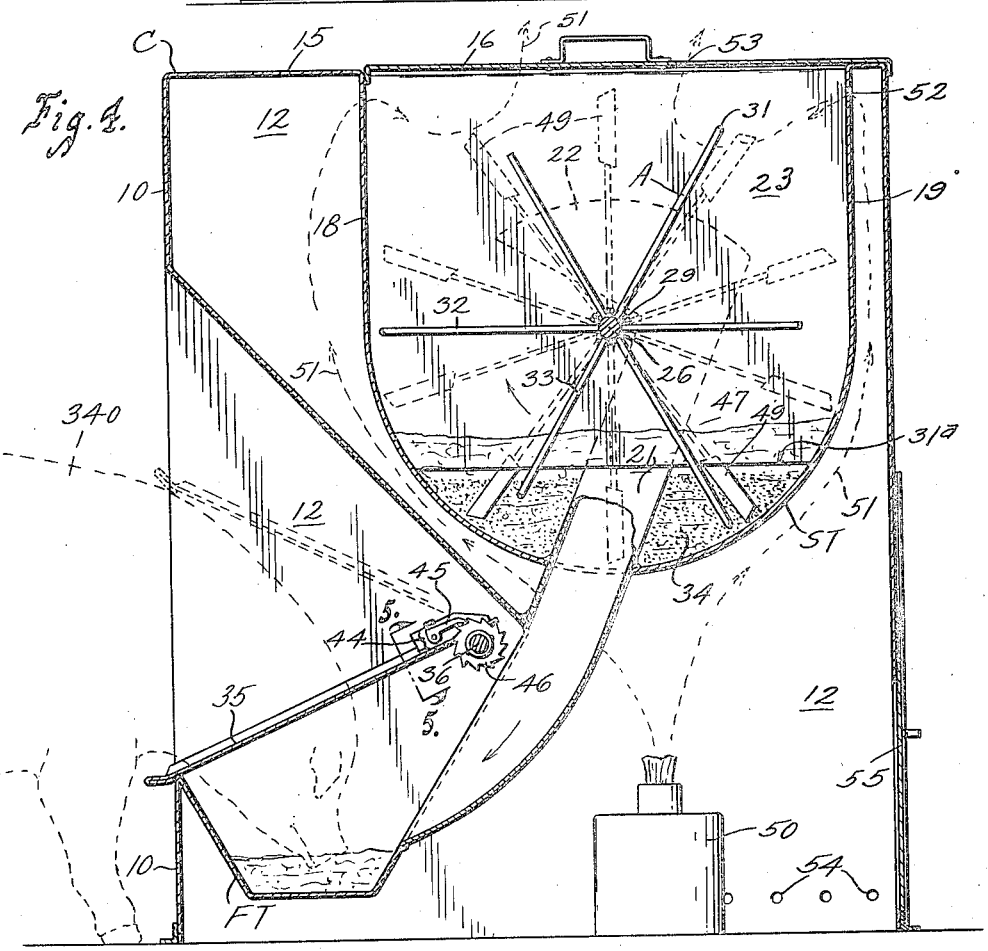
Inventor
Fred K. Chandler
by Bair & Freeman
Attorneys
Witness
H. S. Munzenmaier Patented Mar. 4, 1941

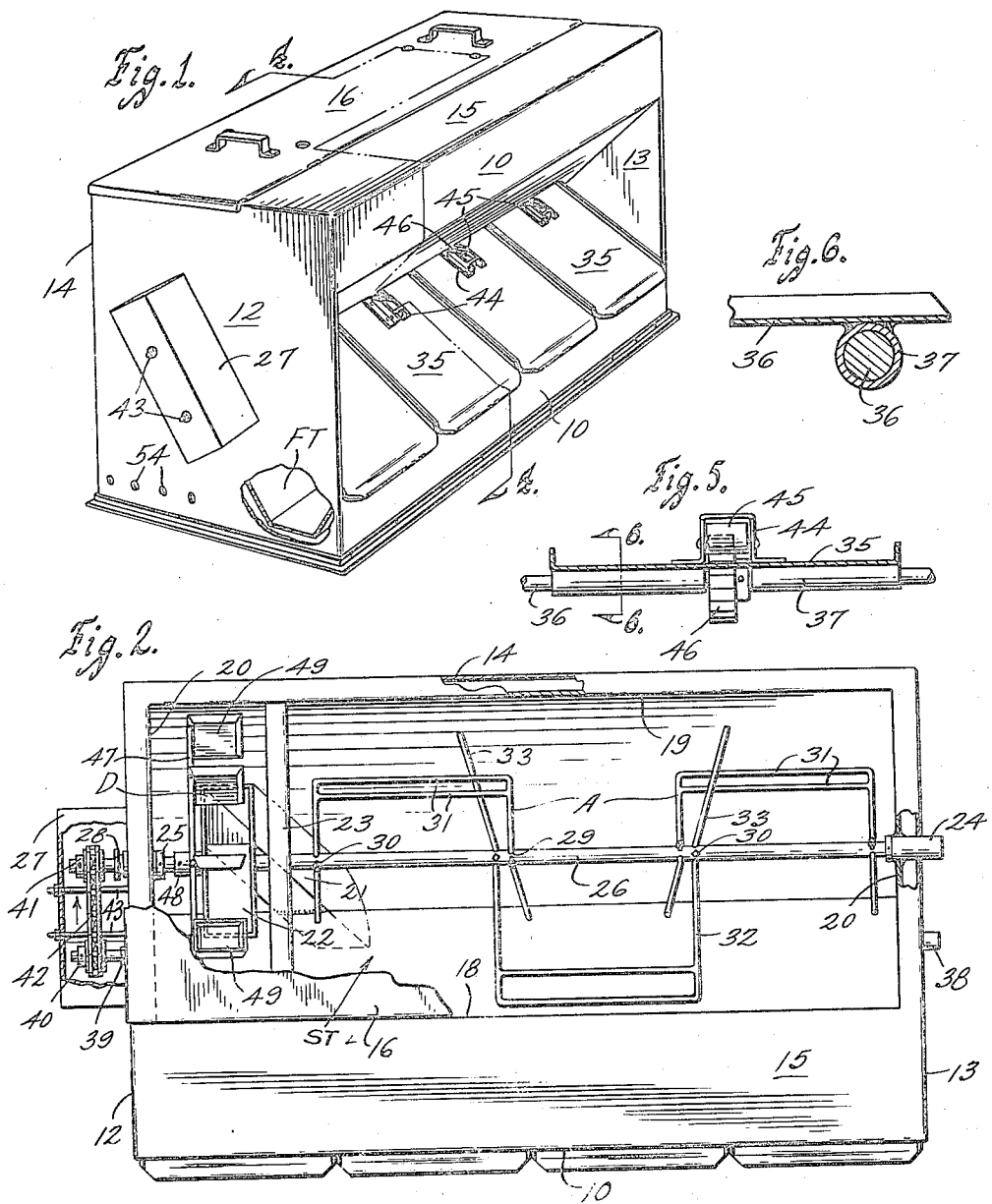

2,234,041

UNITED STATES PATENT OFFICE 2,234,041

APPARATUS AND METHOD FOR FEEDING CULTURED FEED TO ANIMALS

Fred K. Chandler, Des Moines, Iowa

Application August 1, 1938, Serial No. 222,454

8 Claims. (Cl. 119—54)

An object of my invention is to provide an apparatus which is particularly adapted for feeding cultured feed to animals, the apparatus being comparatively simple, durable and inexpensive to manufacture.

A further object is to provide an apparatus comprising a casing having therein a feed storage trough and a feeding trough, said feed storage trough containing ground grain, culturing agent and water, and said feeding trough having cover means, operable when opened by animals desiring to feed therefrom, to agitate the feed and culturing agent in the storage trough and to dispense quantities thereof to the feeding trough.

Still a further object is to provide the agitating means in the form of a rotatable shaft connected by pawl and ratchet mechanism with openable covers on the feeding trough, the shaft also having thereon dispensing pocket means which discharge quantities of the feed into a chute by which it is conveyed to the feeding trough.

Still a further object is to provide a method of culturing feed, agitating the same and supplying a precipitated mixture thereof to animals in accordance with their feeding from the apparatus, the steps of moving the precipitate upwardly and starting it to gravitate toward a feeding source being performed by movements of a part of an animal feeding at such source.

With these and other objects in view my invention consists in the construction, arrangement and combination of the various parts of my device and in the steps of my method, whereby the objects contemplated are attained, as hereinafter more fully set forth, pointed out in my claims and illustrated in the accompanying drawings. Although the apparatus of my invention is susceptible of a variety of embodiments, it is unnecessary to fully describe and illustrate more than one in order to give a full understanding thereof both from its structural and functional standpoints. Accordingly, I have illustrated a preferred and desirable embodiment of the invention in the accompanying drawings, in which:

Figure 1 is a perspective view of an apparatus embodying my invention for feeding cultured feed to animals.

Figure 2 is an enlarged plan view thereof with a major portion of the cover for a feed storage trough thereof broken away and removed and other parts being broken away and shown in section to illustrate details of construction.

Figure 3 is a rear elevational view of my apparatus.

Figure 4 is an enlarged vertical sectional view on the line 4—4 of Figure 1.

Figure 5 is a sectional view on the line 5—5 of Figure 4 showing the hinged connection of a cover member to a supporting shaft therefor; and Figure 6 is an enlarged sectional view on the line 6—6 of Figure 5.

On the accompanying drawings I have used the reference character C to indicate generally a casing. In the casing C is a storage trough ST and a feed trough FT. The casing C comprises a front wall 10, end walls 12 and 13, a back wall 14 and a top wall 15. The wall 15 has an opening therein normally covered by a removable cover 16.

The trough ST comprises a curved bottom 17, a front wall 18, a back wall 19 and end walls 20. The walls 18, 19 and 20, it will be noted, are spaced from the walls 10, 14, 12 and 13 of the casing C so as to provide space within the casing C for heat flow as will hereinafter be referred to.

The storage trough ST has projected into the bottom thereof, a feed chute 21. The chute 21 has a flared reception portion at its upper end indicated at 22 while the lower end thereof opens into the feed trough FT. The chute 21 is located adjacent the left end of the casing C as shown in Figure 2 and a baffle wall 23 separates the storage trough ST into two compartments. The left relatively small compartment has mounted therein a dispensing device D while the other compartment spans the major portion of the length of the storage trough ST and has mounted therein an agitator or feed mixer A.

The walls 12, 13 and 20 support a pair of bearings 24 and 25. A shaft 26 is rotatable in the bearings and extends into a sprocket and chain casing 27 at the left hand end of the casing C. A packing nut 28 is provided for the bearing 25 to prevent water from getting into the casing 27 along the shaft 26.

The agitators A are made of rod material extending through openings 29 in the shaft 26 and retained relative to the openings by set screws 30. The agitators A have portions 31 extending parallel to the shaft 26 and arm portions 32 and 33 extending transversely thereof. The arms 32 and 33 and the bars 31 effectively agitate the mixture 34 in the storage trough ST when the shaft 26 is rotated.

The mixture 34 consists of ground feed such as grain or the like, suitable for feeding animals, such as hogs and cattle. In Figure 4 I show a hog at 34a in dotted lines. The mixture 34 further includes a culturing agent (such as one containing yeast) and water so that the mixture is of a cream-like consistency and, due to the presence of the culturing agent, there is a fermentation process which takes place. The required amount of water to culture one bushel of ground grain is poured into the storage trough ST. The amount of this water varies depending upon the absorption of the grain, the degree of fineness of its grinding and whether or not the feeder is feeding hogs for growth, for rapid gain or for just a maintenance ration, the amount of water varying from eight to ten gallons. Then a quart of culturing agent is poured into the storage trough and then a bushel of ground grain. This procedure is then repeated until the desired amount of water, culturing agent and grain has been placed into the storage trough. The grain is cultured and progressively moves toward the dispensing compartment on the left side of the baffle wall 23 in Figure 2. As the mixture becomes cultured, it precipitates to the bottom of the storage trough and then is drawn under the lower edge 31a of the baffle wall where it is picked up by cups 49 and delivered into the chute 21. The precipitated mixture is shown by heavier stippling in Figure 4. Thus the cups 49 pick up only the cultured portion of the mixture as it becomes cultured.

In order that this process be carried on efficiently, it is necessary to agitate the mixture 34 and I have found that this can be inexpensively accomplished by energy of the animals themselves when they desire to feed from the apparatus. For this purpose I provide a plurality of covers or doors 35 pivotally mounted on a supporting shaft 36. The doors have tubes 37 welded thereto as shown in Figures 5 and 6 which are rotatable on the shaft 36. The shaft in turn is journaled relative to the casing C in bearings 38 and 39. The shaft extends from the bearing 39 into the chain casing 37 wherein a sprocket 40 is secured to the shaft. A sprocket 41 is secured to the projecting end of the shaft 36 and the two sprockets are operatively connected to a chain 42. Access may be had to the sprockets and chain by removing the chain casing 27 which is normally held in position relative to the casing C by tie-rods 43.

Whenever any one of the lids 35 is raised, it will rotate the shaft 36 a portion of a revolution through operation of the following described mechanism: Each cover 35 is provided with a bracket 44 carrying a pivoted pawl 45. Each of the pawls 45 coacts with a ratchet wheel 46 secured to the shaft 36. Accordingly when the animal 34a raises the lid to the position shown by dotted lines in Figure 4, the shaft 36 will be rotated approximately one-eighth of a revolution. This serves both to agitate the mixture of feed, culturing agent and water and to dispense a quantity of the mixture by operating the dispenser D.

The dispenser D consists of a plurality of arms or spokes 47 extending from a hub 48 secured to the shaft 26. On the outer ends of the spokes 47, pocket elements or pans 49 are provided which dip into the feed 34 and elevate it as clearly shown in Figure 4 so that it is discharged into the chute 21 and from there flows by gravity into the feeding trough FT.

Heretofore it has been customary to feed cultured feed by mixing the feed and culturing agent in a barrel of water and then dumping it into the feeding trough, all of which is accomplished manually. With my apparatus the animals can feed whenever they want to and without manual attention except daily replenishing of the supply of feed, culturing agent and water. Whenever an animal desires to feed, automatic agitation of the feed so as to keep the culturing agent well distributed throughout the feed and prevent settling of the feed and culturing agent relative to the water is accomplished. In this way a substantially thin mixture can be fed to the animals so that they receive plenty of water with their feed and the feed is prevented from undesirable uneven fermentation as when the feed stands in a trough without agitation.

A further advantage of my apparatus lies in the storing of the mixture at one point where it can be agitated and the dispensing of the mixture to the feeding trough only as and when the animals require it. This insures always a fresh supply of well agitated mixture to the feeding trough to meet the demands of the animals.

In the winter time it is desirable to keep the mixture 34 from freezing and also impart some warmth thereto which is beneficial to the animals. This is accomplished by placing in the casing C a lamp or burner 50 as shown in Figure 4. The heat therefrom travels as indicated by the arrows 51 in the space between the walls of the storage trough ST and the casing C and enters the trough through perforations 52 and finally discharges to atmosphere through perforations 53 in the lid 16. Openings 54 are provided adjacent the bottom of the casing C to admit air for combustion to the burner 50. A door 55 is mounted slidably on the back wall 14 of the casing C so that access can be had to the burner 50 for removing and replacing it.

Some changes may be made in the construction and arrangement of the parts of my apparatus without departing from the real spirit and purpose of my invention. I therefore intend to cover such modified forms of structure or use of mechanical equivalents as may be reasonably included within their scope.

I claim as my invention:

1. In an apparatus of the character described, a storage trough for holding a mixture of feed, culturing agent and water therein, a movable mixer element for said mixture, a feeding trough at a lower elevation than said storage trough, a cover therefor, an operative connection between said cover and said mixer element for moving said mixer element when said cover is raised by an animal, and a dispensing means also operated by said cover when raised, said dispensing means, upon operation, lifting a quantity of said mixture from said storage trough and transferring it to said feeding trough.

2. In an apparatus of the character described, a storage trough for holding a mixture of feed, culturing agent and water therein, a mixer element for said mixture, a feeding trough at an elevation below and independent of said storage trough, a cover therefor, an operative connection between said cover and said mixer element for moving said mixer element when said cover is raised by an animal and dispensing means also operated by said cover when raised to lift a quantity of said mixture from said storage trough and transfer it to said feeding trough.

3. In an apparatus for feeding cultured feed to animals, a casing, a storage trough and a feeding trough therein, said storage trough being adapted to hold a mixture of ground grain, culturing agent and water, a shaft rotatably supported by said casing, agitating elements thereon for said mixture, a chute, dispensing pocket members carried by said shaft and operable upon rotation thereof to dispense quantities of said feed mixture into said chute, said chute discharging into said feeding trough, a plurality of cover members for said feeding trough and an operative connection between each of said cover members and said shaft to rotate the shaft upon opening of any one of the cover members.

4. In an apparatus for feeding animals, a casing, a storage trough and a feeding trough therein, a shaft rotatably supported by said casing, agitating elements thereon for a hydrated feed mixture in said storage trough, a chute, dispensing pocket members carried by said shaft and operable upon rotation thereof to dispense quantities of said feed mixture into said chute, said chute discharging into said feeding trough, a plurality of cover members for said feeding trough and an operative connection between each of said cover members and said shaft to rotate the shaft upon opening of any one of the cover members.

5. In an apparatus for feeding cultured feed to animals, a casing, a storage trough and a feeding trough therein, said storage trough being adapted to hold a hydrated mixture of ground grain, a shaft rotatably supported by said casing, agitating elements thereon for said mixture, dispensing pocket members carried by said shaft and operable upon rotation thereof to dispense quantities of said mixture into said feeding trough, a plurality of cover members for said feeding trough and an operative connection between each of said cover members and said shaft to rotate the shaft upon opening of any one of the cover members.

6. In a feeding apparatus, a mixing chamber having a storage portion and a discharge portion communicating therewith, means for agitating feed, culturing agent and water in said storage portion of said chamber, means for lifting it from said discharge portion, a trough separate from said chamber portions for receiving the feed, culturing agent and water from said discharge portion, and means whereby animals eating from the trough actuate both of said means.

7. In an apparatus for feeding animals, a casing, a storage trough and a feeding trough therein, a partition in said storage trough open adjacent the bottom thereof and dividing the trough into a mixing chamber and a dispensing chamber, agitating elements in said mixing chamber, pick-up cups in said dispensing chamber, means for operating said agitating elements and said pick-up cups and a chute receiving the feed from said pick-up cups and discharging it into said feeding trough.

8. A method of culturing feed and supplying it to animals comprising the supplying of material comprising uncultured feed, a culturing agent therefor and water to one station, agitating the material at that station to form a mixture, precipitating the mixture and moving the precipitate in an upward direction and transferring the precipitate at an upper point in its movement for gravitational movement to a feeding source, the steps of moving the precipitate in the upward direction and the starting of gravitational movement of the precipitate being performed by movements of a part of an animal feeding at said source.

FRED K. CHANDLER.